Figure 1:
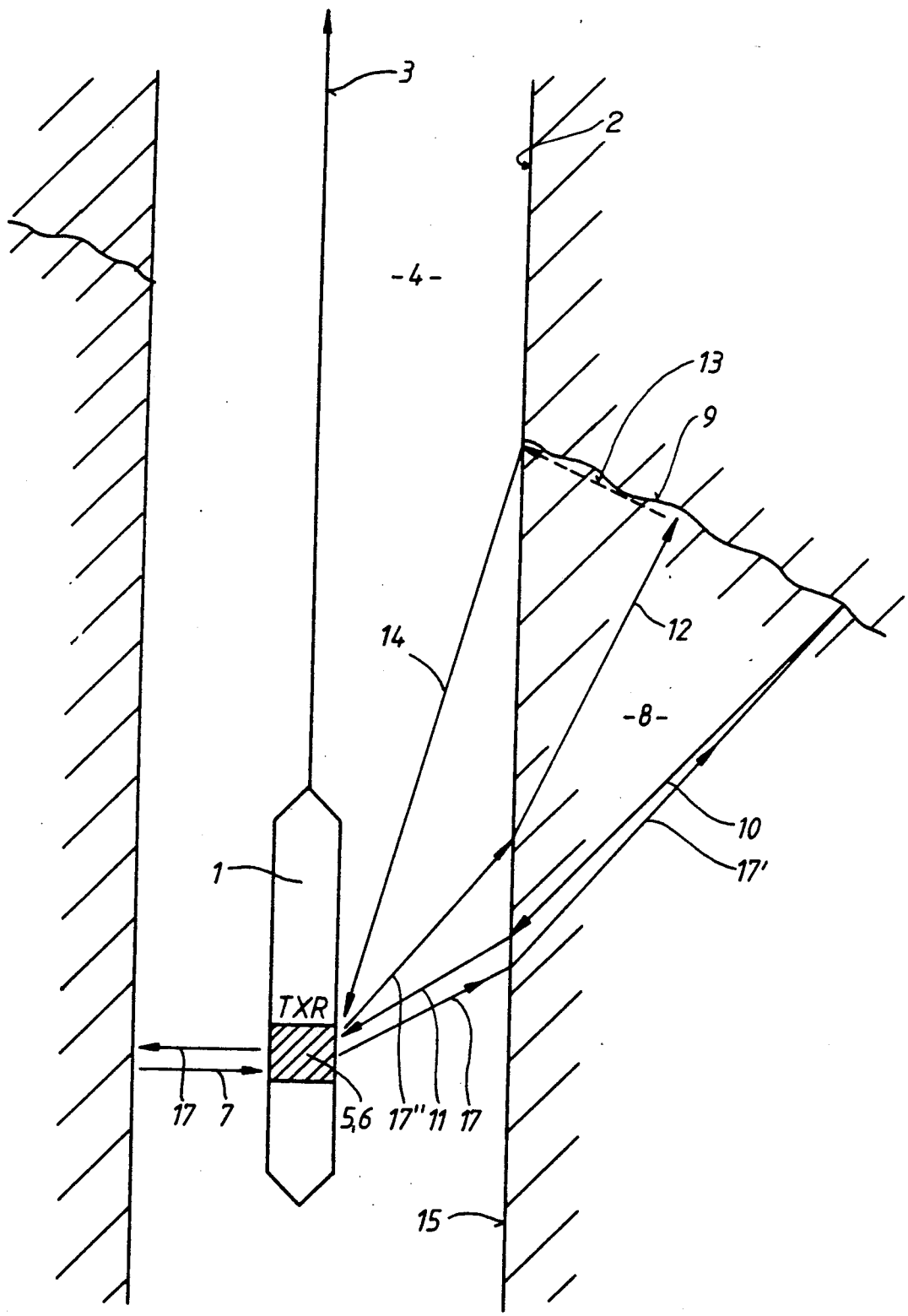

United States Patent [19]

Husten

[11] Patent Number: 5,105,390
[45] Date of Patent: Apr. 14, 1992

[54] ACOUSTIC MEASURING DEVICE

[76] Inventor: Peter Husten, Jakobstal, Switzerland, 9548

[21] Appl. No.: 273,825

[22] Filed: Nov. 21, 1988

Related U.S. Application Data

[63] Continuation-in-part of Ser. No. 680,925, Dec. 11, 1984, abandoned.

[30] Foreign Application Priority Data

Feb. 22, 1984 [DE] Fed. Rep. of Germany ....... 3406445

[51] Int. Cl.⁵ .......................... G01V 1/40; G01V 1/28
[52] U.S. Cl. ...................... 367/31; 367/158; 367/912; 181/106
[58] Field of Search ............... 367/155, 157, 158, 912; 181/106

[56] References Cited

U.S. PATENT DOCUMENTS

| | | | |
|---|---|---|---|
| 2,616,223 | 11/1952 | Lanher | 367/158 |
| 2,849,075 | 8/1958 | Goolbey | 367/31 |
| 2,868,311 | 1/1959 | Tullos | 367/912 |
| 2,894,597 | 7/1959 | Kean et al. | 181/106 |
| 3,697,937 | 10/1972 | Ingrau | 181/106 |
| 4,131,875 | 12/1978 | Ingrau | 367/32 |
| 4,419,748 | 12/1983 | Siegfried | 367/32 |
| 4,715,019 | 12/1987 | Medlin et al. | 367/31 |

OTHER PUBLICATIONS

Huang et al., "The Correlation of Tube Wave, Events With Open Fractures in Fluid Filled Boreboles", Current Research, Part A, Geological Survey of Canada, paper 81-1A, pp. 361-376, 1981.

Primary Examiner—Nelson Moskowitz
Attorney, Agent, or Firm—Paul H. Gallagher

[57] ABSTRACT

A sonde is secured to the end of an electrical cable and is inserted is a bore hole by means of the electrical cable. The sonde has a transmitter and receiver. The other end of the cable is secured to apparatus on the surface, and the apparatus includes means for forming a signal transmitting it through the cable to the transmitter, the transmitter emitting the signal from the sonde, that signal bouncing off of the wall of the bore hole and then back to the receiver. The signal is then sent from the receiver through the cable to the apparatus on the ground. That apparatus also has means for recording the results of the signals so formed and mainpulated. The transmitter and the receiver in the sonde are placed together, not more than one half of the wave length of the signal, and to a spacing as small as zero, with transmitter and receiver effectively in one location.

13 Claims, 6 Drawing Sheets

FIG 4
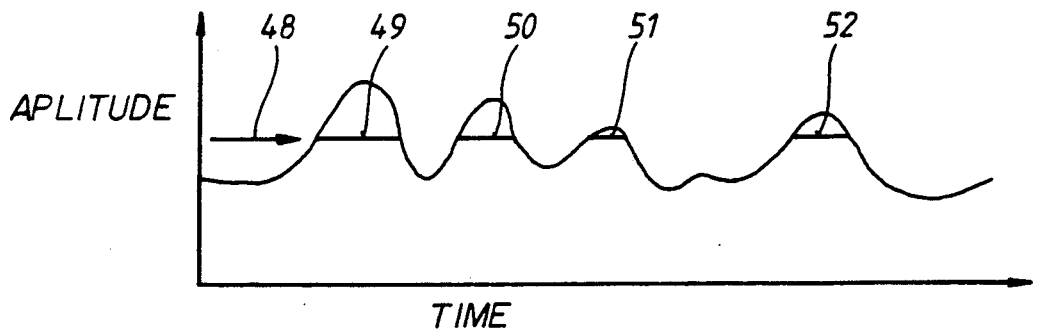
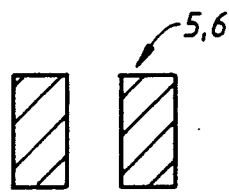
FIG 5.1
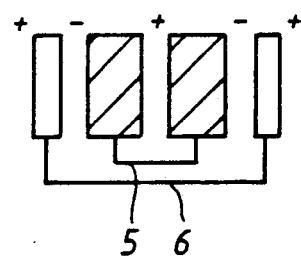
FIG 5.2
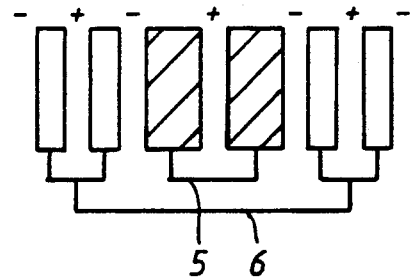
FIG 5.3
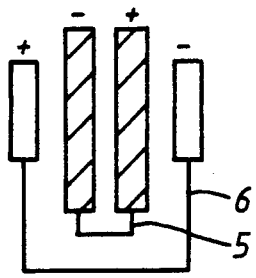
FIG 5.4

ACOUSTIC MEASURING DEVICE

FIELD OF THE INVENTION

The invention resides in the field of a sonde or probe that is used for sensing and measuring configurations in a bore hole, or other formations in the ground. A sonde is connected to the end of an electrical cable and inserted into the bore hole. Electrical signals are transmitted from the ground through the cable to the sonde, and the sonde has a transmitter and receiver, and the signals are transmitted from the sonde into the bore hole and they are reflected from the surface of the bore hole back to the receiver, and then to the apparatus on the ground. By means of this procedure the operator can determine the size of the bore hole, and size and nature of formations in the wall of the bore hole, that may be in the form of fractures, permeable portions, recesses, etc. that are considered different from a smooth bore hold surface.

CROSS REFERENCE

This application is a continuation-in-part of my prior and copending parent application, U.S. Pat. No. 06/680,925, filed Dec. 11, 1984, for Acoustic Measuring Device, now abandoned.

PRIOR ART

G.B. -P.S. 750,976.

Geophysical Well Logging, Hubert Guyod and Lemay E. Schane, Vol. 1, Hubert Guyod, Houston, Texas, U.S.A., 1969.

OBJECTS OF THE INVENTION

The obJects of the invention will be apparert from the following disclosure of a specific apparatus and the conclusion following that specific disclosure.

IN THE DRAWINGS

FIG. 1, schematized cross-section through a bore hole in which the device of the invention is positioned.

Figure 2:
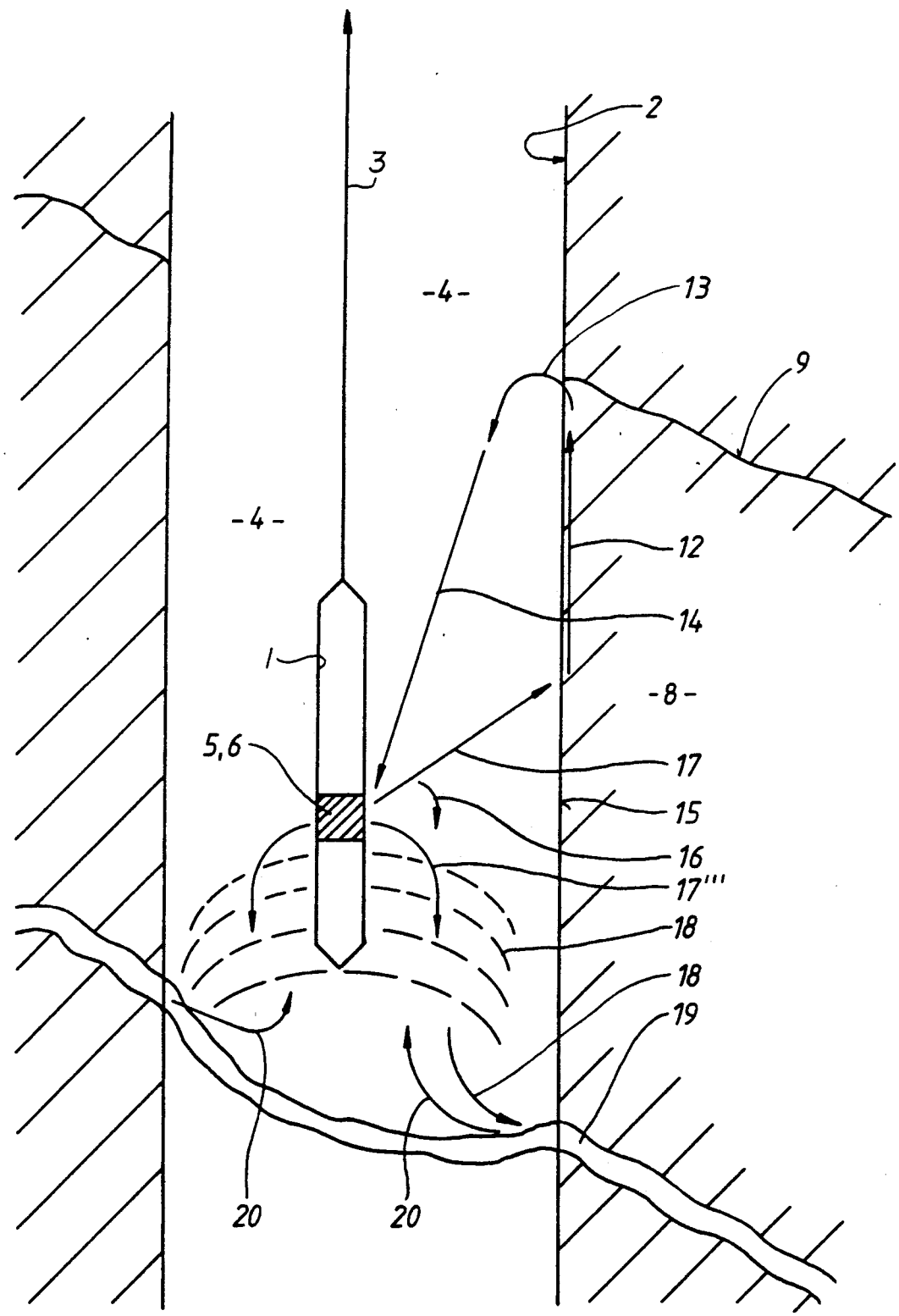

FIG. 2, representation similar to FIG. 1, but in another recording situation.

Figure 3:
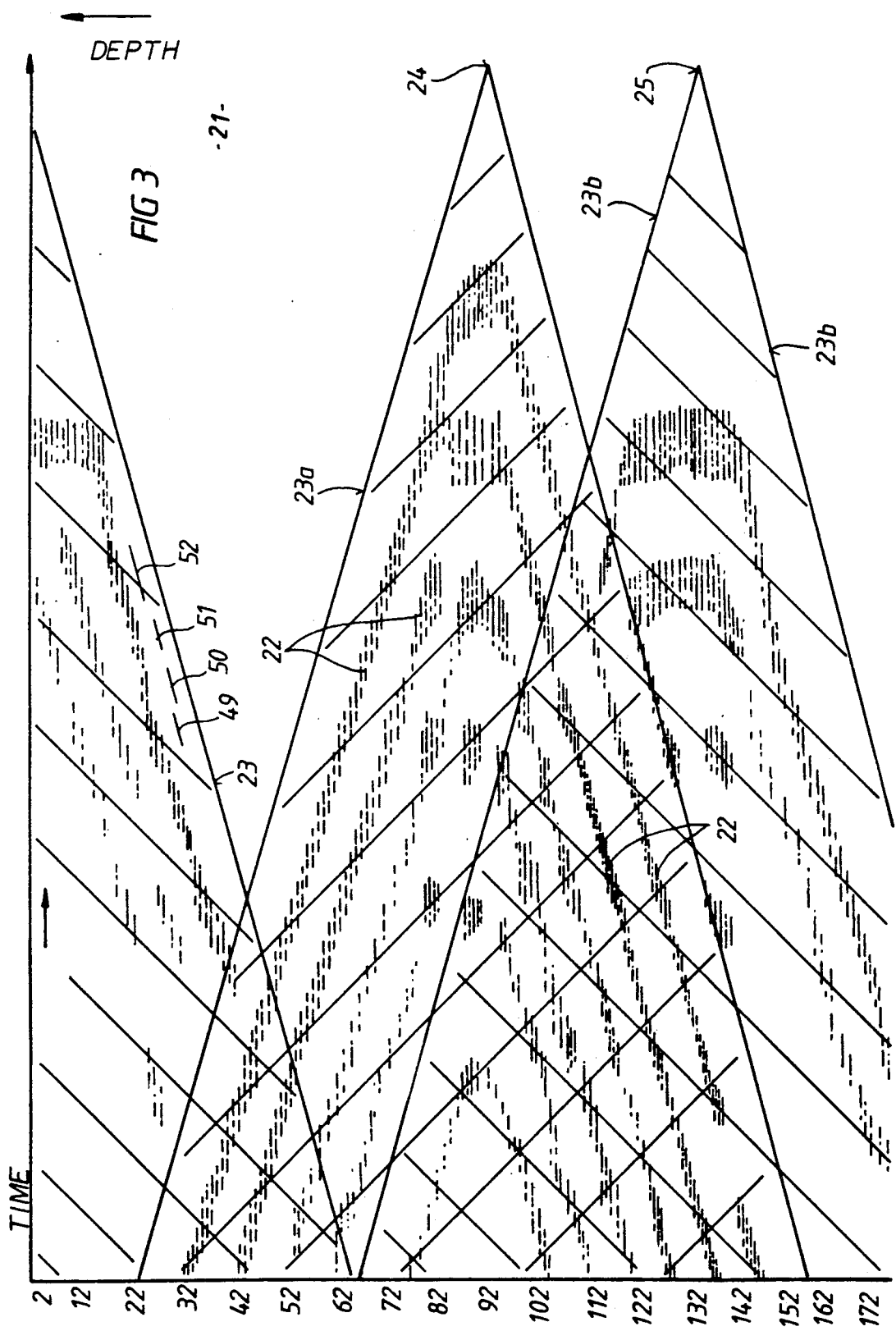

FIG. 3, simplified representation of a recording result, achieved with the sonde of the invention, wherein along the abscissas the depth and along the ordinates the transit time is shown.

FIG. 4, representation to show how out of the echo signal of the sonde, the recording diagram according to FIG. 3 is created.

FIG. 5.1, schematized representation of a first form of a transmitter-receiver installation.

FIG. 5.2, second form of a transmitter-receiver installation.

FIG. 5.3, third form of a transmitter-receiver installation.

FIG. 5.4, fourth form of a transmitter-receiver installation.

Figure 6:
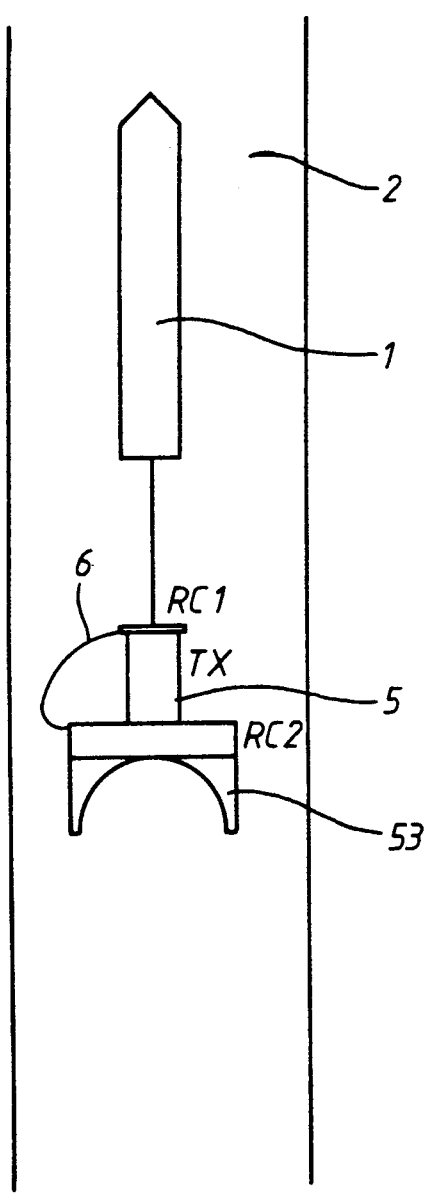

FIG. 6, schematized exhibition of a further form of a transmitter-receiver installation in a recording situation in the bore hole.

Figure 7:
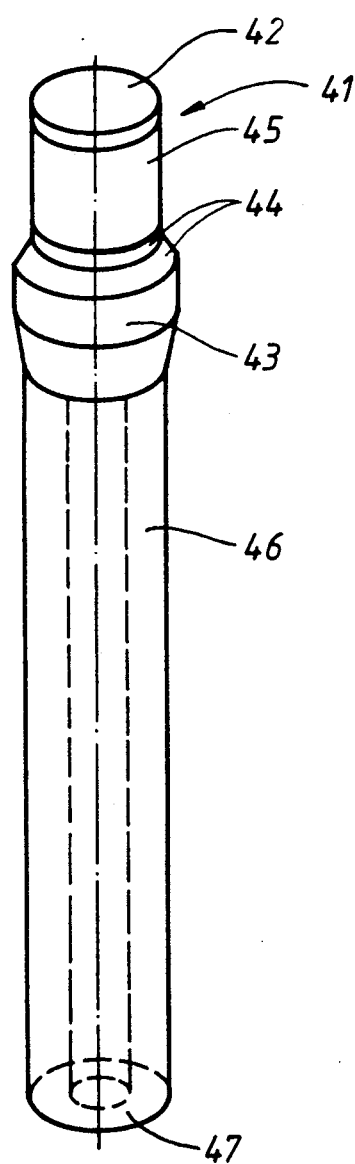

FIG. 7, schematized side view of a further form of a transmitter-receiver installation.

Figure 8:
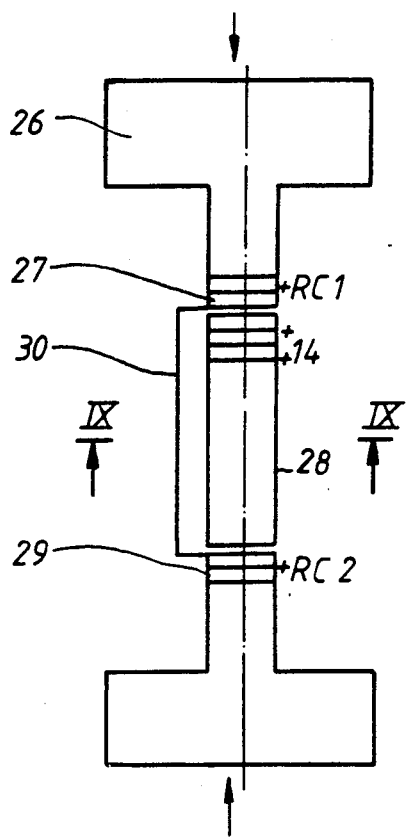

FIG. 8, schematized side view of a further form with a transmitter-receiver installation with mainly axial acoustic radiation.

Figure 9:
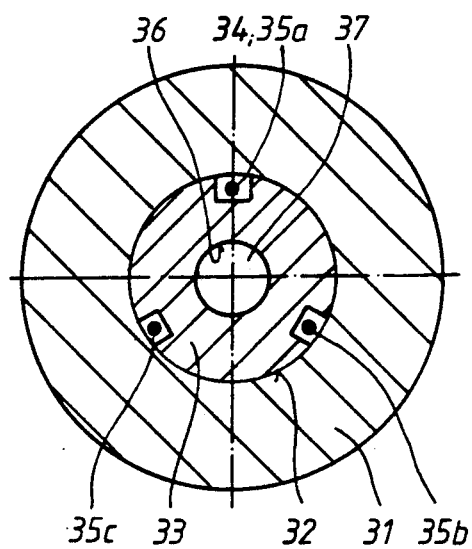

FIG. 9, cross-section according to line IX—IX in FIG. 8.

Figure 10:
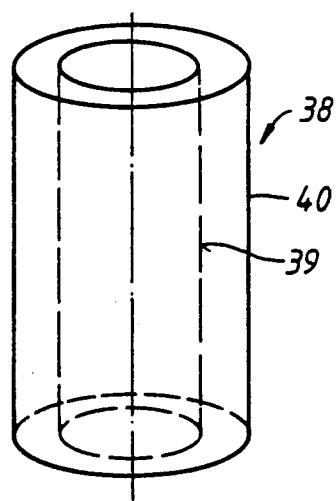

FIG. 10, schematized side view of a further transmitter receiver installation with mainly axial acoustic radiation.

Figure 10A:
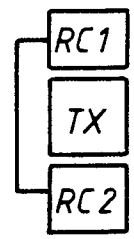

FIG. 10A, principle of the assembly of transmitter and receiver.

Figure 10B:
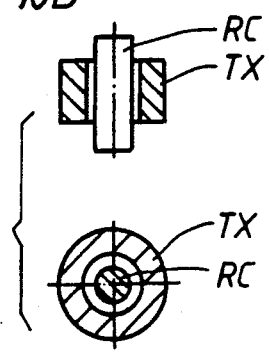

FIG. 10B, two further examples of the assembly in principle of transmitter and receiver.

Referring in detail to the drawings, the following illustrations and descriptions refer to a bore hole only, but the device is also useful in other formations, such as caves, galleries, tunnels, etc.

The device, also known as a logging device, is indicated in its entirety at 1 and shown in FIGS. 1 and 2 in a bore hole 2. The device is operable at a zero depth, i.e., at the top of the bore hole, and in any desired depth, for instance up to 10,000 meters in depth, and at this depth the pressure of water in the bore hole is about 1,000 atmospheres. The hydrostatic pressure rises about one atmosphere per 8–10 meters in depth, depending on the fluid used in the bore hole. Fluids that are commonly used include baryte, water, or bentonite mud. The bore hole fluid is indicated at 4.

The device 1, known as a sonde or probe, is secured to the end a cable 3 and in one example of use, it is positioned centrally of the bore hole, i.e. along its axis.

The temperature in a bore hole rises about 3° C. every 100 meters in depth, which would result in a temperature of about 200° C. at a depth of 7,000 meters. The bore hole illustrated in FIGS. 1 and 2 is of cylindrical shape and it may be of a diameter of from about 1" to about 70". The cable 3 is utilized for transmitting signals to and from the sonde, and is connected to apparatus on the surface, which includes a logging truck, not shown. The apparatus on the surface may be of known kind, and includes means for transmitting signals to the sonde and receiving the signals from the sonde, and recording them in various ways.

The sonde 1 is a cylindrical pressure vessel, sealed on all sides and may be made of stainless steel, brass-alloy, aluminum, or any of other comparable materials. The sonde includes a transmitter 5 in mechanical or physical contact with the fluid 4, contact being made fir instance by a rubber membrane positioned outside the sonde, behind which the sealed transmitter is positioned. The sonde also includes a receiver 6 located essentially at the position of the transmitter, that is, without space therebetween in longitudinal or axial direction, for purposes to be referred to hereinbelow.

In the functioning of the device, a wave 17 is emitted from the transmitter and it strikes the wall 15 of the bore hole, on the right side (FIG. 1), and penetrates the wall and propagates as an emitted wave 17' in the formation 8, and strikes a fracture 9 or a boundary in the formation 8. The signal is reflected from the boundary 9 in a reflected signal 10 and this latter signal penetrates into the bore hole as a signal 11 and is received by the receiver 6.

An additional element of the emitted wave occurs at 17" which proceeds diagonally upwardly along the bore hole wall 15, and it proceeds into the formation 8 in the form of a compressional wave 12, and then strikes the fracture 9 and is converted to a reactional wave 13 (fluid wave) and then reflexes again into the bore hole 2 by means of the bore hole wall 15. This wave then produces a tube wave 14, which reaches the receiver 6 as an effective signal and is received by the receiver.

A principal feature of the present invention is that the tube wave 14 which is determined by the permeability of the fracture 9 or by the formation boundaries, can be received practically undisturbed by the receiver because the wave is of a selected frequency range, being the strongest signal that is received, and also the strongest effective signal utilized for recognition of the fracture 9 or of the boundary of the formation 8. The energy of this tube wave 14 is a quantitative indication of the size of the fracture.

By means of the reflected signal 10, the existence of the, fracture 9, or the boundary of the formation 8, is detected, this being done by the phase deviation of the signal 10 relative to the signal 17.

FIG. 2 represents wave propagation of total reflection, in contrast to FIG. 1. In FIG. 2 the compressional wave 12 is produced by the emitted wave 17 in the vicinity of the bore hole wall 15. The wave 12 proceeds in axial direction within the formation 8, along the bore hole wall and is reflected by a fracture 9 or a boundary of the formation, and again returns as a reaction wave 13 within the bore hole 2, continuing as a tube wave 14 which reaches the receiver 6. When the direction, of the emitted wave 17 turns downwardly a certain amount, as indicated by the arrow 16, the wave 17 still reaches the bore hole wall, but it cannot penetrate the wall.

The emitted wave 17 remains in the bore hole fluid 4, as indicated by the curved arrows 17''' which point downward and at this location form a wave front 18, which in the bore hole, moves in an axial direction because of its interaction with bore hole wall 15. This wave front 18 can strike a fracture 19, which may be occasioned by the bore hole opening up, or by a permeable zone, whereby the fracture becomes "inflated" by the wave front 18. The wave 18 reacts with the fluid contained in the fracture 19, causing a reaction wave 20 which may be referred to as an inflected or secondary tube wave according to the wave type, and this wave now returns to the receiver 6 in the opposite direction of the wave front 18, where it is recorded.

As long as the sonde 1 is moved upward with a constant speed, a pattern represented in FIG. 3 is produced. In this figure, the depth of the bore hole is indicated by the ordinates, that at the lower margin, the depth of the bore hole, and that at the upper margin, the position relative to the top.

In the pattern of FIG. 3 the abscissas show the recording time of the signals received, in milliseconds. The upper left hand intersection/point represent zero time according to FIG. 4. The signals are interpreted by a threshold comparative method. In FIG. 4 the transit time of a given signal received at a certain time is on the abscissas, and the amplitude of this signal recorder on the ordinates. All signal traces exceeding threshold 48 (i.e. having a bigger amplitude than threshold 48) are traced as a line 49-52 by a computer as in FIG. 3. In FIG. 3 in roughly schematized representation, the lines 49-52 are repeated grossly enlarged. On the left side of the ordinates, the pulse groups are recorded as a number, the group number 2 meaning for example that the pulses 9 to 16 have been recorded. The numerical value 1 represents eight single emission pulses, and therefore the mentioned number 2 states that the single emission pulses 9-16 were emitted within the space occupied by this number. In the graph, 172 pulse groups are recorded, i.e., recorded are 172×8 single pulses equal to a total of 1,076 single pulses. Also recognizable are V-patterns 22 which represent the arrivals of tube waves, 14, 20. In the lower part of the bore hole can be recognized the start of a fracture indication 23, which runs diagonally from bottom to top. Also, a further fracture indication 23a can be recognized, the peak 24 of which is at the depth of the block #92, whereas the peak 25 is positioned in a fracture with the block #122.

The pattern of FIG. 3 shows three overlapping fracture indications 23, 23a, 23b, whose locations can be immediately recognized in a printout pattern, although plate registered arrivals of tube wave reflections are overlapping.

FIGS. 5.1 to 5.4 show principal transmitter/receiver configurations while FIG. 6 to 10 show the constructive arrangements of such transmitter/receiver configurations.

The transmitter/receiver arrangement in FIG. 5.1 consists of two discs which can be electronically switched from a transmitter mode to a receiver mode and vice versa.

FIG. 5.2 shows a symmetrical transmitter 5 surrounded by a symmetrical receiver 6, while FIG. 5.3 shows a symmetrical configuration of transmitter 5 and receiver 6, wherein the receiver 4 includes six discs.

FIG. 5.4 shows that the transmitter 5 and receiver 6 may be of different sizes, the discs of transmitter 5, being larger than those of the receiver.

Each disc consists of PTZ, a piezo-electric sinter material made of metal oxides, but other known materials may be used if desired.

An asymmetrical configuration of transmitter-receiver, as shown in FIG. 5.4, may be used.

FIG. 6 shows a further asymmetrical configuration of a transmitter 5 and receiver 6. The transmitter 5 is closed at its upper end by a relatively small plate RC1, while at the lower end is a large receiver plate RC2, this completing the transmitter 5. Similarly the lower receiver plate RC2 may be provided with a semi-circular end piece 53 opening downwardly, providing greater sensitivity of the transmitter-receiver 5, 6, at its lower end.

A transmitter-receiver including a piezo effect is shown FIG. 7, in which an upper pressure piston 42 is connected to a lower piston 43 by means of a tension bolt (not shown) held tightly against each other. The lower piston 43 is in the form of one piece, connected to the tube 46 therebelow and open at 47. The tube may also be opened sideways at the circumference, for damping purposes, for instance by providing holes, slots, perforations, or similar openings. The tube 46 acts as an amplifier for the transmitter 44, which consists of two counter-polarized piezo elements. Above the piezo elements and constituting a part of the transmitter 44 is a receiver 45, terminating at its upper end by the upper pressure piston 42. The whole assembly 41, consisting of pressure piston 42, receiver 45, transmitter 44 and pressure piston 43, is of cylindrical shape.

FIG. 8 shows an additional example of transmitter-receiver, here consisting of a steel dumbbell 26, the mid section of which is composed of disc-shaped elements. In this case the receiver 27 consists of a stack of counter-polarized discs, of the kind referred to above, whereby the transmitter 28 is comparable to a disc shape consisting for instance of 14 pairs of piezo-electric discs which are, toward the rear, capped by a second receiver 29, also consisting of two discs. The upper receiver 27 and lower receiver 29 are connected by a wire 30.

The complete disc-shaped stack of transmitter and receiver discs 27, 28, 29 is held tightly between the end pieces of the sealed dumbbell.

FIG. 9 is a cross section through the transmitter 28, this view showing piezo disc 31 having an inner space into which an insulation tube 33 is inserted. Also this view shows, distributed around the circumference of the tube 33, slots for solder connections 35 of the contact plate between the piezo discs 31. The solder connections 35, are individually identified, 35a for instance are positive connecting points for the transmitter, points 35b for positive connecting points for the receiver 29, and points 35c are the mass-connections. The insulating tube 33 has an inner space 36 for the tension bolts 37 which secure the two T-shaped end pieces of the steel dumbbell 26 tightly together. By means of this tension bolt 37, also the T-shape pieces of the dumbbell are screwed against each other in order to mount, under high axial pressure, the cylindrical sections of the transmitter and receiver 27, 28, 29.

The transmitter of FIGS. 8 and 9 is arranged preferably for an axial beam, whereas the transmitter as represented in FIG. 10 shows, preferably a radial direction of emission. In FIG. 10 a cylindrical element 38 corresponds to disc-shape element for a transmitter or a receiver as in FIG. 9. Analogous to the structure shown in FIGS. 8 and 9, it is possible to plug into and connect with one another, several tube-shape elements 38 so that a structure analogous to FIGS. 8 and 9 results. Applied to each element 38 is an inner coating 39 and outer coating 40.

This coating preferably is made of silver. While the inner and outer cylindrical surfaces of the element 38 shown in FIG. 10 are coated, it is to be noted that in the device of FIGS. 8 and 9, the front planes of the various contact surfaces of the piezo discs are coated.

Similarly to the arrangement of FIG. 8, it is possible to stack the cylindrically shaped elements 38 and to electrically excite the coated surfaces 38, 40; this results in a change of thickness of the element 38 (FIG. 10) and preferential radial emission of the transmitter signal.

As shown in FIG. 10A a transmitter TX with two receivers RC1 and RC2 can be mounted on top of one another, or as shown in FIG. 10B an arrangement can be used wherein one is within the other, i.e. the cylindrical receiver RC mounted within the larger cylindrical transmitter TX. The lower part of FIG. 10B shows a cross section through the arrangement in the upper part of FIG. 10B.

In all of the different forms of the transmitter-receiver configurations referred to above, an additional potential measurement can be combined in the bore hole. The sonde is covered by an insulating rubber hose and on the outside of which is a platinum electrode, or an electrode of other similar conductive materials, whereby the potential is measured between this electrode and the housing of the sonde or the casing of the bore hole 2 as a counter electrode. It is also possible to use a ground electrode as a counter electrode.

The foregoing specific disclosure points up the advantages of the invention, in contrast to previously known apparatus and methods for the same general purpose, but which is less efficient and effective than the present invention. In apparatus heretofore known, the transmitter and the receiver, in the probe, were spaced apart a considerable distance. Signal waves sent out by the transmitter were split into parts, by the character of the bore hole wall. A pulse emitted from the transmitter, hit the bore hole wall and split into different parts, a first part arriving at the receiver through the bore hole fluid; a second part arriving at the receiver as a refracted wave; and a third part penetrating the rock in the bore hole wall and encountering discontinuities of the rock from which echo signals are formed, these being reflected through the rock back into the bore hole and returning to the receiver. In such previous apparatus, the consequent incoming signal to the receiver, which was spaced from the transmitter, and the parts of the signal so arriving at the receiver were a mixture of dissimilar, and not linear, signals, and analysis of those signals was very difficult.

In carrying out the main purpose of the invention, the distance between the transmitter and receiver in the present device is within one-half the wavelength of the signal emitted in the bore hole fluid. This distance between the transmitter and receiver, is very small, and as small as virtually zero.

With the use of suitable analytical methods (mathematical, electronic, digital, graphic and manual as well) for instance the following information from data recorded with the echo sound can be derived:
- average borehole diameter,
- reflection index mud/formation
- localization of fractures and permeable zones,
- degree of fracturing,
- permeability index,
- shear modulus,
- bulk modulus,
- existence of reflecting planes within the formation; this includes those planes not opened up by the bore holes.

The following may be considered a summary of the features and advantages of the invention:

1. A sound wave or pressure pulse transmitter and a receiver for sound waves or pressure pulses or secondary effects caused by the former are ideally mounted in axial alignment effectively without space therebetween.

1.1. Certain deviations from the ideal of the common reference (zero-) point for transmitter and receiver and the similarity of these two are tolerated.

1.1.1. The axial distance between transmitter and receiver are not more than half a wave length of the emitted signal in the water.

1.1.2. The transmitter and receiver with differing geometrical directions of their sensitivity can be combined, e.g. one- with two- and/or three-dimensional transmitters and/or receivers.

1.1.3. A transmitter and a receiver of various types and sizes can be combined with one another.

1.1.4. Transmitter and/or receiver or parts of the transmitter and/or receiver can be arranged asymmetrically.

1.1.5. The sonde can be used in the bore hole in a centralized position, but also in an eccentric one, or hanging freely.

1.1.6. Transmitter and/or receiver or parts thereof may be positioned against the bore hole wall.

1.2 The transmitter can be built as a single element, but also as a combination of several elements creating sound/pressure; for example:

1.2.1 piezo elements,
1.2.2 magneto-strictive elements,
1.2.3 mechanical devices and membranes,
1.2.4 pneumatic or hydraulic devices,
1.2.5 electrical sparks, 1.2.6 chemical reactions and explosions,
1.3 The sound wave- or pressure wave- receiver can be built as a single element or as a combination of several elements,
1.3.1 which are sound/pressure sensitive, e.g.
1.3.1.1 piezo elements,
1.3.1.2 magneto-strictive elements,
1.3.1.3 mechanical devices and membranes,
1.3.1.4 pneumatic and hydraulic devices, 1.3.1.5 electrical sensors (differential condensers, strain gauges, etc.) measure the deformation of a receiver-plate or -membrane,
1.3.1.6 optical sensing of the movement of a receiver-plate, and photosensitive stress changes in acrylic glass for example.
1.3.2 which are suitable to measure electro-kinetic potentials, e.g.
1.3.2.1 metal-electrodes, such as lead, iron, platinum, etc.
1.3.2.2 gas or fluid electrodes.
1.4 Suitable electronic circuits make the use of the same pressure element as a transmitter and as a receiver possible, e.g.
1.4.1 piezo-elements,
1.4.2 membranes with optical registration (displacement of membranes are registered optically),
1.4.3 hydraulic instruments with photo-electric coupling (receiver with a piston, the photographic movement of which is electrically recorded);
1.5 The emitted signal can be shaped according to its application as
1.5.1 an a periodical pulse (sinus, rectangle, etc.) of any amplitude,
1.5.2 short-termed wave train of va lengths, frequency, amplitude,
1.5.3 continuously emitted signal, frequency- and/or amplitude-modulated,
1.5.4 the frequency range, given by the natural and bore hole conditions, lies between several Hertz and below 10 Kilo-Hertz.

I claim:

1. An acoustic measuring device of the character including a sonde on an electric cable and insertable into a bore hole in the ground and movable axially longitudinally therein by moving the cable, the device being capable of detecting a fracture in the ground adjacent the bore hole, such fracture being of the kind having a boundary surface in the ground displaced from the wall of the bore hole, and the bore hole at times including mud, the sonde including a transmitter and a receiver, and the cable being capable of transmitting electric signal pulses from apparatus on the surface of the ground to the transmitter and from the receiver to that apparatus, the transmitter being capable of transmitting signal pulses forming tube waves that travel axially, longitudinally of the bore hole, and also that travel through the wall of the bore hole, and the receiver being capable of receiving signal pulses reflected from the wall of the bore hole and from the boundary surface of the fracture, wherein
   . the transmitter and receiver are axially aligned and spaced apart in axial direction a distance less than one-half the tube wave length.

2. An acoustic measuring device according to claim 1 wherein, the sonde includes potential electrodes arranged concentric to the axis between the transmitter and the receiver.

3. An acoustic measuring device according to claim 1 wherein,
   the sonde includes a plurality of transmitters and receivers arranged with their sensing elements oriented in differented directions respectively.

4. An acoustic measuring device according to claim 1 wherein,
   the sonde includes a cylindrical body, a fore part of which is in the form of a disc-shaped pressure pistons,
   a tube-like transmitter and receiver are interposed and gripped between said pressure pistons,
   the transmitter and receiver include the counter-polarized piezo elements, and
   a tube is fastened to the pressure pistons to which the transmitter is adjacent, and the end of the tube remote from the latter pressure piston is open.

5. An acoustic measuring device according to claim 1 wherein,
   the sonde includes a dumbbell shape body, the central portion of which includes stacked discs gripped between end sections of the body, and
   the central portion includes a transmitter, and the stacked discs include counter-polarized pairs of discs on the ends of the transmitter, and another counter-polarized pair of discs closing the ends of the transmitter and the discs thereon.

6. An acoustic measuring device according to claim 1 wherein, the sonde includes axial oscillators producing and registering tube longitudinal waves of frequencies less than 10 KHZ, the effective wave length in mud being approximately the same as, or longer than, the diameter of the bore hole.

7. An acoustic measuring device according to claim 1 wherein,
   the registration time for the wave trains received persists for up to 1 second.

8. Measuring device for examining geological formations adjacent to a mud filled bore hole by means of a sonde secured to an electric cable let down into the mud in the bore hole, wherein,
   the sonde including a transmitter producing longitudinal tube waves, and a receiver operable for receiving those waves,
   the transmitter being an axial oscillator acting in the direction longitudinally of the bore hole,
   the transmitter being operable for transmitting frequencies of less than 10 kHz whereby the wave length of the echo thereof in the mud is equal to or greater than the diameter of the bore hole, and
   the transmitter and receiver are positioned relative to each other in the direction of the axis of the bore hole, and they are spaced apart in that direction a distance less than half the longitudinal wave length of the echo in the mud.

9. Measuring device according to claim 8 wherein,
   the sonde includes a plurality of transmitters and a plurality of receivers.

10. Measuring device according to claim 8 wherein,
    the sonde (1) includes a cylindrical body (41), including upper and lower disc shaped pressure pistons (42, 43) stressed tightly toward each other in axial direction,
    between said pressure pistons are a tube-like receiver (45) and a transmitter (44) made up of a pair of counter-polarized piezo elements, the transmitter being adJoined to the lower pressure piston (43), and secured to the lower pressure piston (43) is a tube (46) having a lower port open (47).

11. Measuring device according to claim 9 wherein,
the sonde (1) includes a cylindrical body (41), including upper and lower disc shaped pressure pistons (42, 43) stressed tightly toward each other in axial direction,
between said pressure pistons are a tube-like receiver (45) and a transmitter (44) made up of a pair of counter-polarized piezo elements, the transmitter being adJoined to the lower pressure piston (43), and
secured to the lower pressure piston (43) is a tube (46) having a lower port open (47).

12. Measuring device according to claim 8 wherein,
the sonde (1) is dumbbell-shaped, having a small central section and large end sections,
the central section constituting a transmitter (28) made up of a plurality of counter-polarized pairs of discs,
each end section includes a receiver made up of a pair of counter polarized discs (27, 29),
the discs of the transmitter and receiver forming a stack, and
means stressing the end sections toward each other, thereby tightly gripping the discs of the transmitter and receivers together.

13. Measuring device according to claim 9 wherein,
the sonde (1) is dumbbell-shaped, having a small central section and large end sections,
the central section constituting a transmitter (28) made up of a plurality of counter-polarized pairs of discs,
each end section includes a receiver made up of a pair of counter polarized discs (27, 29), and
the discs of the transmitter and receiver forming a stack, and
means stressing the end sections toward each other thereby tightly gripping the discs of the transmitter and receivers together.

* * * * *